Sept. 9, 1969 L. W. PARTRIDGE 3,466,558
MEASURING APPARATUS
Filed Sept. 19, 1966
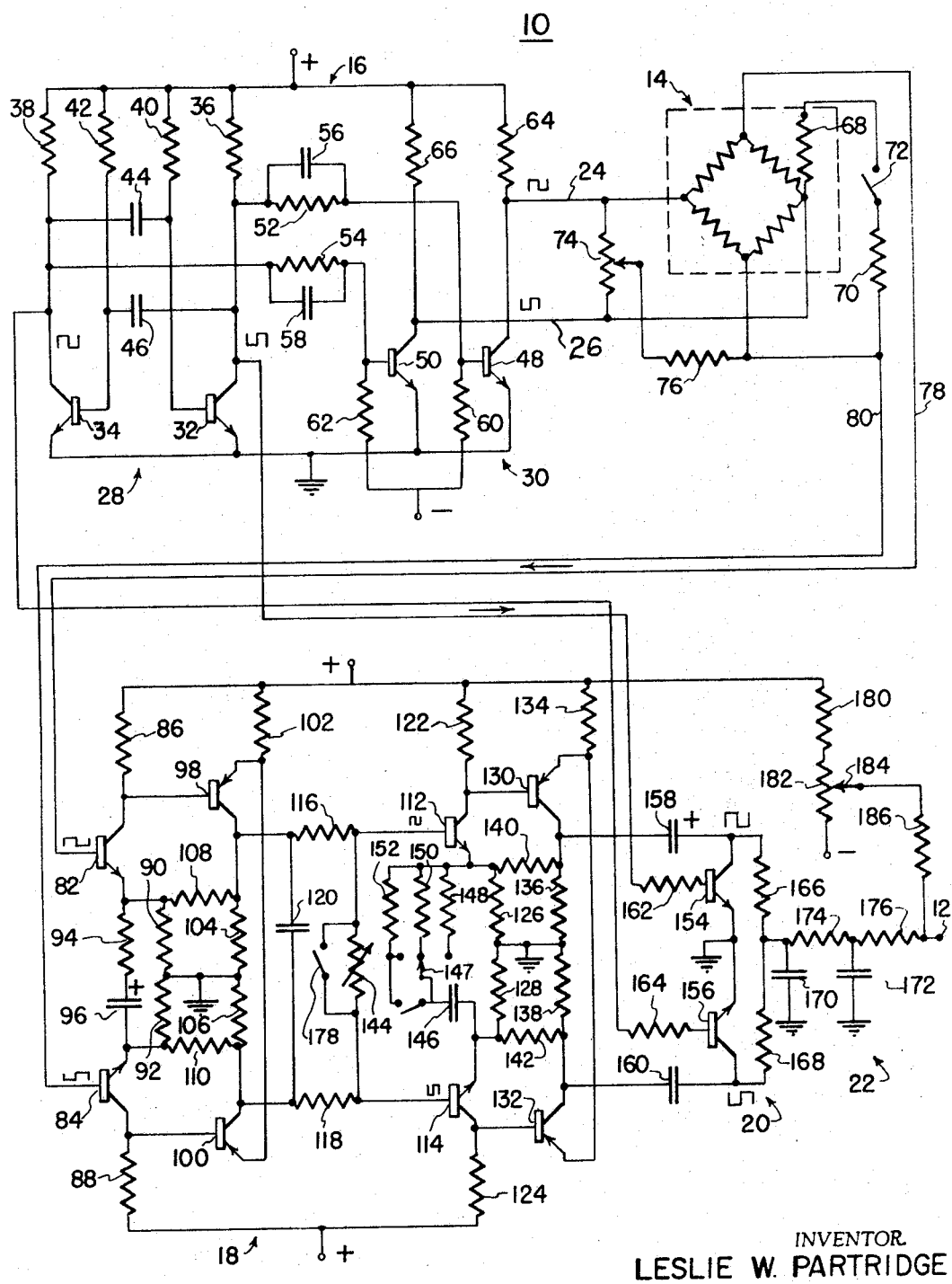
INVENTOR.
LESLIE W. PARTRIDGE
BY:
MASON, KOLEHMAINEN,
RATHBURN & WYSS United States Patent Office 3,466,558
Patented Sept. 9, 1969

3,466,558
MEASURING APPARATUS
Leslie W. Partridge, Janesville, Wis., assignor to The Burdick Corporation, Milton, Wis., a corporation of Delaware
Filed Sept. 19, 1966, Ser. No. 580,244
Int. Cl. H03f 3/38
U.S. Cl. 330—10                                    7 Claims

ABSTRACT OF THE DISCLOSURE

Measuring apparatus for use with a bridge circuit includes a transistor multivibrator and a fast-acting transistor driver stage developing a balanced square wave signal direct coupled to bridge input terminals. The modulated signal from the bridge is direct coupled to the input terminals of a balanced differential amplifier having common signal mode rejection characteristics. The amplifier includes direct coupled stages as well as floating, non-grounded gain and range controls. The amplifier output is detected in a full wave phase sensitive demodulator to provide an indication corresponding to bridge unbalance.

---

The present invention relates to measuring apparatus, and more particularly to an improved circuit for use with a strain gauge bridge for accurately measuring a mechanical force signal.

Wheatstone bridge strain gauges, including one or more variable resistance transducers, are used in various fields when it is desired to measure a small mechanical force signal. For example, such gauges may be used to measure physiological signals such as blood pressure and the like, and for measuring other parameters such as strain in a material, temperature, pressure and so forth. As is well known, a bridge type strain gauge usually includes four resistive elements arranged in a square, one or more of which varies in accordance with the magnitude of the quantity to be measured. The bridge is initially balanced with respect to its voltage division characteristic, and is unbalanced resistively to an extent depending upon the magnitude of variations in the measured parameter.

Various types of strain gauge measuring circuits have been used in the past. In one simple arrangement, a direct current voltage is applied across opposed input terminals of the bridge, and a direct current signal is obtained from the output terminals. This direct current signal is very small, and in order to be useful, must be amplified in a direct current amplifier. The amplified signal is then forwarded to a meter or other device for providing an indication of the amount of unbalance of the bridge. Such direct current systems are subjected to many difficulties principally because the direct current signals to be measured are very small and because of the difficulty in achieving the necessary stability and accuracy in the operation of a direct current amplifier.

In order to overcome these problems, systems of the so-called carrier signal type have been developed. In these systems an AC carrier signal, usually sinusoidal, is applied to the input terminals of the bridge, and is modulated by unbalance of the bridge. The modulated output signal from the bridge is coupled to the input of an AC amplifier, and after amplification, the signal is demodulated to provide a DC signal proportional to bridge unbalance. Such systems use transformer coupling at the input to the bridge, or at the output from the bridge, or both. In addition, substantial filtering is required to remove sixty cycle interference, and also at the output to produce a DC signal from the rectified AC signal. Thus, this kind of system is expensive.

An additional problem arises in the wave carrier systems because of reactive unbalance, which may be caused by unbalance of the bridge itself, by distributed reactance in the leads including those to and from the bridge, and by the transformers, depending upon the operating frequency. Reactive unbalance results in an out-of-phase quadrature signal component which is forwarded to the amplifier. The quadrature component if large enough may saturate the amplifier thus impairing its accuracy. The quadrature component may also affect the stability of the amplifier and cause drift of the base line or null point of the output signal.

In order to overcome the problems encountered with sinusoidal carrier waves, it has been proposed that a square wave carrier signal be used. The advantage of the square wave signal is that any undesirable signal components caused by reactive unbalance are concentrated at the vertical portions of the square wave excursions in the form of sharp spikes. The area of the square waves should be much larger than the area of the spikes to realize the best advantage.

Square wave systems developed thus far have not realized any great advantage, however. Known systems use transformer coupling between the signal generator and the bridge and/or between the bridge and the amplifier, use capacitive coupling in the amplifier, or use an unbalanced system. This tends to distort the square waves and to greatly increase the effects of reactive unbalance. Transformers distort square waves due to shunt impedance and leakage reactance, and create the major portion of reactive unbalance due to capacitive leakages. Coupling capacitors tend to distort square waves also. Their main fault, however, is in extending the area of the spike waves. This occurs due to spike overloads being clipped and stored in the capacitors. Unbalanced circuits allow detection of undesirable, balanced signals.

Accordingly, it is an object of the invention to provide improved measuring apparatus for use with a strain gauge bridge.

It is a further object to provide an improved carrier signal system which is low in cost but which is very accurate and highly stable.

Another object is to provide a system which requires only a minimal amount of filtering.

Another object is to provide such a system in which problems resulting from reactive unbalance are reduced to insignificance.

In accordance with the above and other objects of the present invention, a measuring circuit constructed in accordance with the present invention may comprise a carrier signal source, or generator, serving to provide a balanced square wave signal at a pair of output terminals. By a balanced signal, it is meant that neither output terminal is held at a fixed potential so that, as a result, complementary and out-of-phase square wave signals are produced at each of the terminals.

In accordance with a feature of the invention, the carrier signal generator includes a multivibrator for developing a square wave signal, as well as a driver stage including fast-acting transistors controlled by the signal from the multivibrator. This arrangement provides a square wave that is balanced, and which has nearly vertical leading and trailing edges. Thus, the wave closely approximates an ideal square wave.

The balanced square wave signals from the generator are direct-coupled (i.e., without the use of energy storing devices such as transformers or capacitors) to the input terminals of the bridge, wherein the carrier signal is modulated by unbalance of the bridge in accordance with the parameter to be measured. The output terminals of the bridge are direct-coupled to a balanced differential amplifier which serves to amplify those signals which are proportional to unbalance of the bridge, while suppressing signals common to both bridge output teminals, such as noise, sixty cycle interference, and the like. The differential amplifier is both stable and sensitive by virtue of the fact that improved balance is obtained through the use of floating, non-grounded gain and range controls, and because the stages of the amplifier are direct-coupled. The output signal from the amplifier is coupled to a full wave synchronous demodulator and filtered in a small, inexpensixe filter section in order to provide a DC signal accurately proportional to the magnitude of the measured parameter.

In accordance with the invention, therefore, a square wave carrier signal is used, and this signal both before and after modulation in a bridge, and throughout amplification, is direct-coupled through the circuit without the use of coupling transformers or coupling capacitors. In addition, both the input to the bridge and the output from the bridge are balanced. As a result, a highly accurate and sensitive measurement can be obtained with relatively inexpensive equipment, and without the use of large and expenive filters and/or transformers. The absence of energy storing devices in the form of coupling transformers and capacitors assures that the square wave is not distored, and reduces the quadrature problem to the point where there is little effect on the balance point.

Other objects and advantags of the invention will appear from the following, more detailed description of an illustrative embodiment of the invention. In the course of the description, reference is had to the single figure of the drawing, which figure is a diagrammatic representation of measuring apparatus constructed in accordance with the principles of the invention.

Referring to the drawing, the strain gauge measuring circuit of the invention is designated as a whole by the reference number 10. The circuit 10 functions to provide a direct current signal at an output terminal 12, the magnitude of which is directly proportional to the quantity to be measured. More specifically, the signal produced at the terminal 12 is proportional to the degree of unbalance of a wheatstone bridge strain gauge 14 and the unbalance of the gauge is effected by variations in the measured parameter which acts as a mechanical force signal against one or more legs of the bridge.

The circuit 10 includes, in the main, a carrier signal source or generator designated generally as 16 and coupled to the bridge. The output from the bridge is coupled to a differential amplifier generally designated as 18, the output of which is forwarded to a phase sensitive full wave synnchronous detector 20 coupled in turn to a small filter section 22. The output signal from the terminal 12 may be utilized in any desirable manner to provide an indication of the unbalance of the bridge 14, and thus of the parameter being measured. For example, the terminal 12 may be coupled to a meter, a recording device, an oscilloscope, or to a further amplifier.

The carrier signal generator 16 develops a balanced square wave driving signal which is forwarded to the input terminals of the bridge 14 by means of a pair of conductors 24 and 26, and includes a multivibrator generally designated as 28, and a driving stage generally designated as 30. The multivibrator is of the astable type, thus serving to develop a square wave signal, and includes a pair of transistors 32 and 34 arranged in a common emitter configuration. The collector electrodes of transistors 32 and 34 are coupled to a point of positive potential through a pair of load resistors 36 and 38, and a biasing potential is applied to the base electrodes of the transistors through a pair of resistors 40 and 42. The coupling between the transistors 32 and 34 required to produce operation of the multivibrator is provided by a pair of capacitors 44 and 46 coupled between the base and collector electrodes of the respective transistors 32 and 34.

When a square wave carrier signal is used to drive a strain gauge bridge, it is highly desirable that the square wave signal be as close as possible to an ideal square wave. The multivibrator 28, using transistors for switching rather than mechanically operated switch means, produces a square wave without the excessive transients unavoidably included in the signal when a mechanical chopper is used. In adition, it avoids the distortion caused by transformer coupling. However, due to the use of coupling capacitors 44 and 46 between the transistors 32 and 34, the leading edge of each positive excursion of the square wave is somewhat curved, since the capacitors prevent the transistors from being driven immediately to their non-conducting state.

In order to eliminate the curved leading edge of the square wave, the driver stage 30 is connected to the output of the multivibrator 28. More specifically, the driver stage 30 includes a pair of fast acting driver transistors 48 and 50 having base electrodes coupled to the collector electrodes of the multivibrator transistors 32 and 34 by means of a pair of resistances 52 and 54 each shunted by a capacitor 56 and 58. The transistors 48 and 50 are normally biased to a nonconductive condition by bias resistors 60 and 62 connected between the base electrode and a point of relatively negative potential. The emitters of the transistors are grounded and the collector electrodes are connected to a point of positive potential through a pair of load resistors 64 and 66.

In the operation of the carrier signal generator 16, the multivibrator alternatively operates the transistors 48 and 50 in order to provide a balanced square wave signal across the conductors 24 and 26. More specifically, when the transistor 32 is nonconductive, the base of the transistor 48 is relatively positive and the transistor 48 conducts, thereby effectively connecting the conductor 24 to ground. Meanwhile, the transistor 34 is conductive, the transistor 50 is nonconductive, whereby a relatively positive potential is applied to the conductor 26. In the following half cycle, the transistor 32 conducts, the transistor 34 is nonconductive so that the transistor 48 is nonconductive, and a relatively positive potential is applied to the conductor 44 while the conductor 46 is effectively grounded. In this manner, a balanced square wave signal is applied to conductors 24 and 26, this signal being made up of complementary balanced square wave signals applied to the conductors 24 and 26.

Since the function of the driver stage 30 is to square the leading edges of the square wave, it is desirable that the transistors 48 and 50 have a high gain and that they be fast-acting, i.e., that they have a low turn-on voltage. For this reason, germanium transistors are preferred for the driver stage.

The fast-acting transistors 48 and 50 insure that the leading edges of the balanced square signals are abrupt, and also insure that the balanced signals are in synchronism, i.e., that the upward excursion of one signal occurs concurrently with the downward excursion of the other signal. If the synchronism is not precise, an undesirable signal component, common to both sides of the balanced signal, is produced. Such a component would cause undesirable spikes after demodulation of the signal, and a considerable amount of drift with temperature.

The balanced square wave signal appearing on the conductors 24 and 26 is applied to opposed input terminals of the strain gauge bridge 14. The strain gauge bridge 14 may be of any suitable type, and is illustrated as including four resistances schematcially illustrated in the form of a square with four sides and four terminals, each leg of the square comprising a resistance element. It will be understood that one or more of the resistance elements is variable in accordance with the parameter to be measured. Associated with the bridge circuit 14 is a calibration circuit including a pair of resistances 68 and 70 in series with a calibration switch 72, these being connected to shunt one leg of the bridge. The bridge may be balanced by means of a resistor 74 shunting the inlet terminals of the bridge, the resistor 74 having an adjustable tap in series with a resistor 76, the resistor 76 and part of the resistor 74 shunting another leg of the bridge.

The parameter to be measured acts on the bridge in the form of a mechanical force signal serving to vary the resistance of one or more legs of the bridge, thereby to unbalance the bridge in accordance with the magnitude of the measured parameter. The balanced square wave signal which is applied to the bridge is modulated by the unbalanced bridge in accordance with the measured signal. The modulated signal is directly coupled from the output terminals of the bridge to the differential amplifier 18 by means of a pair of conductors 78 and 80.

The signal appearing at the output of the bridge includes undesirable components in addition to the desired modulated carrier signal. The undesirable signals are different from the signal to be amplified in that they have equal phase and amplitude at both bridge output terminals, and are commonly called common mode signals. The major undesirable signal results from unbalanced saturation voltages in driver transistors 48 and 50, and since these signals are temperature sensitive they cannot easily be compensated. Other undesirable common mode signals are noise and 60 cycle interference.

In order to amplify the modulated square wave signal appearing on the bridge output conductors 78 and 80, while suppressing the above mentioned signals common to the conductors 78 and 80, the amplifier 18 is a balanced differential amplifier having common signal mode rejection characteristics. The amplifier includes two stages of amplification, each including four transistors and, in order to provide fast response of the amplifier, to prevent drifting of the null point, and to provide for stability in the operation of the amplifier, the stages and transistors are exclusively direct-coupled and floating non-grounded sensitivity and range controls are provided.

The first stage of the amplifier includes transistors 82, 84, 98 and 100 connected as a complementary type differential amplifier. The emitter and collector electrodes of the transistors 82 and 84 are connected across the potential source by resistors 86, 88, 90 and 92, and their base electrodes are direct coupled to the bridge output conductors 78 and 80. The emitters of transistors 80 and 82 are connected by a resistor 94 and a capacitor 96. The bases of the transistors 98 and 100 are direct coupled to the collectors of the transistors 82 and 84, and the emitter and collector electrodes are connected to the potential supply by resistors 102, 104 and 106. Resistors 108 and 110 are coupled between the collector electrodes of the transistors 98 and 100 and the emitter electrodes of the transistors 82 and 84. Voltage gain of the first amplifier stage is approximately determined by the sum of the resistances 108 and 110 divided by the resistance 94.

The amplified output signal from the first stage appears across the collector electrodes of the transistors 98 and 100 and is direct-coupled to the base electrodes of second stage transistors 112 and 114. A filter including a pair of resistors 116 and 118 and a capacitor 120 is used to filter any spikes which may have developed at the edges of the square view in order to prevent these spikes from saturating the transistors of the second amplifier stage. The second stage is similar in many respects to the first stage, and includes transistors 112, 114, 130 and 132. The emitter and collector electrodes of the transistors 112 and 114 are connected across the potential source by resistors 122, 124, 126 and 128, and the bases of the transistors 130 and 132 are direct coupled to the collectors of the transistors 112 and 114, while their emitter and collector electrodes are coupled to the potential supply by resistors 134, 136 and 138. Resistors 140 and 142 are coupled between the collectors of transistors 130 and 132 and the emitters of transistors 112 and 114.

In accordance with a feature of the invention, the differential amplifier 18 is provided with sensitivity and range controls which do not affect the base line or null point of the output signal when adjusted. The sensitivity control comprises a variable resistor 144 coupled between the base electrodes of the transistors 112 and 114. The variable resistor 144 is not grounded, and thus cannot introduce an unbalanced condition between the base electrodes of the transistors. Similarly, the range control includes a capacitor 146 in series with a three position switch 147 operative to place any one of three different value resistors 148, 150 and 152 in series with the capacitor 146 between the emitter electrodes of the transistors 112 and 114. Accordingly, the sensitivity of the amplifier may be adjusted by variation of the resistance of the resistor 144, while the range or gain factor of the amplifier may be adjusted by control of the switch 147, and both of these functions may be achieved without the necessity of introducing a ground between the bases or emitters of the transistors 112 and 114. As a result, when the sensitivity is adjusted, or when the range switch 147 is operated, the null point or base line corresponding to the zero output signal position is not shifted.

In order to demodulate the amplified signal provided by the differential amplifier 18, the phase sensitive demodulator or detector 20 is provided. The detector includes a pair of transistors 154 and 156 having their collector electrodes coupled by means of a pair of coupling capacitors 158 and 160 to the collector electrodes of the transistors 130 and 132. The emitter electrodes of the transistors 154 and 156 are grounded, while the base electrodes are coupled through a pair of limiting resistors 162 and 164 to the multivibrator 28 of the carrier signal generator 16. The transistors 154 and 156 are alternatively rendered conductive by signals applied to bases of the transistors 32 and 34. As a result, the output terminals of the differential amplifier 18 are alternately connected to ground whereby a substantially level DC signal is forwarded to the output terminal 12 through a pair of resistors 166 and 168. In order to remove any small spikes that may remain in the output signal after demodulation, the filter section 22, including a pair of capacitors 170 and 172 and a pair of resistors 174 and 176, is coupled between the demodulator 20 and the output terminal 12.

The circuit 10 may include means for positioning the null or zero output point of the output terminal 12. The null point is the output signal level corresponding to a balanced condition of the bridge. For this purpose, a switch 178 shunts the sensitivity adjustment resistor 144 and serves the purpose of removing the input to the third and fourth stages of the amplifier when the switch is closed. In addition, a voltage dividing circuit including a resistor 180 and a variable resistor 182 is connected between points of positive and negative potential. A tap 184 in series with a resistor 186 is connected to the output terminal 12 and the zero or null point may be adjusted by moving the tap 184.

It is believed that the operation of the circuit 10 will be apparent to those skilled in the art from the above detailed description. Reviewing the operation of the circuit, a balanced square wave signal is developed across the conductors 24 and 26 by means of the signal generator 16. This square wave signal closely approximates an ideal square wave due to the use of transistor switching, and due to the use of fast-acting transistors 48 and 50 in the driver stage 30. The square wave signal is direct-coupled to the input terminals of the bridge where it is modulated by unbalance of the bridge in accordance with the magnitude of the parameter to be measured. The output from the bridge is direct-coupled to the differential amplifier, where the portions of the output signal, caused by modulation of the bridge are amplified, while undesirable signals common to the output conductors 78 and 80 are suppressed.

The output from the amplifier is forwarded to the demodulator 20, which demodulator is phase sensitive by virtue of the fact that it is driven from the multivibrator 28. Accordingly there is produced at the output terminal 12, after only minimal filtering, a signal accurately proportional to the unbalance of the bridge. The use of the full wave phase sensitive demodulator 20 allows the output signal to indicate both positive and negative values.

It will be appreciated that the omission of capacitors and transformers from the circuit not only greatly improves the operation of the circuit in many respects, but also substantially decreases the cost of the circuit. In addition the combination of an entirely balanced input to the bridge and output from the bridge in a square wave system, without transformers, is believed to result in accuracy, stability, and lack of drift heretofore unobtainable in strain gauge systems.

In a device constructed in accordance with the present invention, components having values listed in the following table were found to produce excellent results. These values are given by way of illustration of one embodiment of the invention only, and their inclusion here is not intended to limit the invention, which is defined in the claims appended to the specification. In the following table, the transistors are identified by their numerical type designation, the value of all resistors is in ohms, and the value of all capacitors is in microfarads.

TRANSISTORS

| | |
|---|---|
| 32, 34, 48, 50 | 2N1306 |
| 82, 84, 112, 114 | 2N1304 |
| 98 100, 130, 132 | 2N1305 |
| 154, 156 | 2N3394 |

RESISTORS

| | |
|---|---|
| 36, 38, 52, 54, 116, 118, 40, 42, 74, 122, 124, 144, 162, 164, 166, 168 174, 176, 182 | 10,000 |
| 60, 62, 76 | 100,000 |
| 64, 66 | 301 |
| 86, 88 | 2,400 |
| 90, 92, 136, 138 | 2,000 |
| 94 | 130 |
| 102 | 470 |
| 104, 106 | 2,200 |
| 108, 110, 140, 142 | 8,250 |
| 126, 128 | 15,000 |
| 134 | 470 |
| 148 | 162 |
| 150 | 2,100 |
| 152 | 5,360 |
| 180 | 6,800 |
| 186 | 330,000 |

CAPACITORS

| | |
|---|---|
| 44, 46, 170 | .1 |
| 56, 58 | .01 |
| 96, 146 | 50 |
| 120 | .005 |
| 158, 160 | 1 |
| 172 | .047 |

What is claimed as new and desired to be secured by Letters Patent of the United States is:

1. Measuring apparatus for use with a bridge circuit adapted to be unbalanced in dependence on a parameter to be measured, said apparatus comprising the combination of:

a multivibrator including a pair of alternately conducting controlled conduction devices each having an output circuit;

a pair of transistors each having output electrode means and each having input electrode means coupled to one of said output circuits for alternately placing said transistors in a conductive condition thereby to provide a balanced square wave signal at said output electrode means, said transistors being characterized by the qualities of relatively low turn on voltage and relatively high gain;

first coupling means characterized by the absence of reactive elements for direct coupling said output electrode means to an opposed pair of input terminals of said bridge so that the balanced square wave signal is modulated in said bridge in accordance with the degree of unbalance of the bridge;

a balanced differential amplifier having common signal mode rejection characteristics and having an output and a pair of input terminals;

second coupling means characterized by the absence of reactive elements for direct coupling said differential amplifier input terminals to a pair of opposed output terminals of said bridge;

and detecting means coupled to the output of said differential amplifier for producing an indication in accordance with the unbalance of the bridge.

2. Measuring apparatus as claimed in claim 1, said pair of transistors comprising germanium transistors.

3. Measuring apparatus as claimed in claim 1, said amplifier including a plurality of amplifier stages, said stages being exclusively direct-coupled.

4. Measuring apparatus as defined in claim 1, said amplifier comprising an amplifier stage including a pair of controlled conduction devices each including input and output electrodes, and means for adjusting the gain of said stage comprising variable value, non-grounded resistance means coupled between corresponding ones of said input electrodes.

5. Measuring apparatus as claimed in claim 4 said adjusting means comprising a continuously variable resistance.

6. Measuring apparatus as claimed in claim 4 said adjusting means comprising a plurality of resistance elements, and a multi-position switch for selectively coupling said elements between said corresponding input electrodes.

7. Measuring apparatus as claimed in claim 1 said amplifier output comprising a pair of output terminals for producing a balanced amplified signal, and said detecting means comprising a full wave phase sensitive demodulator including a pair of controlled conduction devices, said devices having control electrodes coupled to said multivibrator for alternately rendering said devices conductive and said devices each having a pair of output terminals connected to shunt one of said amplifier output terminals.

References Cited

UNITED STATES PATENTS

| | | | |
|---|---|---|---|
| 2,777,640 | 1/1957 | Kaufman | 328—3 X |
| 2,956,234 | 10/1960 | Olsen | 330—10 |
| 3,305,734 | 2/1967 | Buttenhoff | 328—3 X |

NATHAN KAUFMAN, Primary Examiner

U.S. Cl. X.R.

330—15, 16